H. VATERHAUS.
NUT LOCK.
APPLICATION FILED JAN. 24, 1912.
1,075,523.
Patented Oct. 14, 1913.
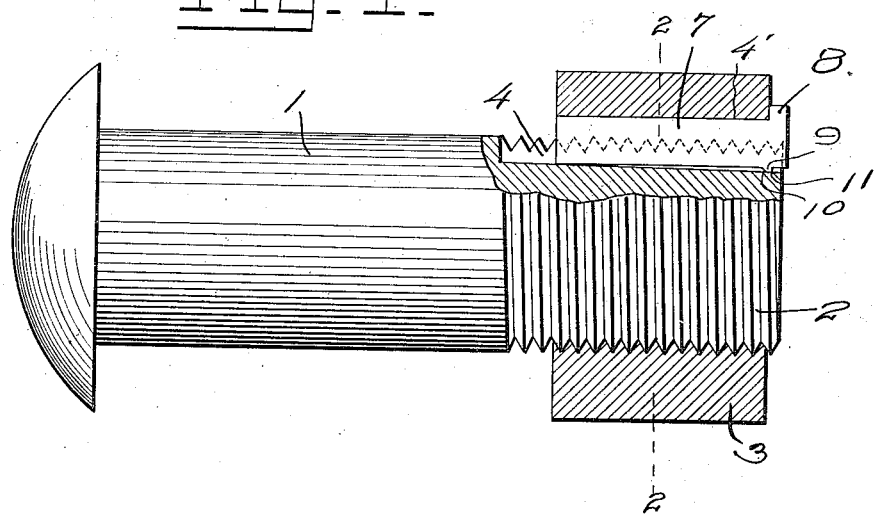
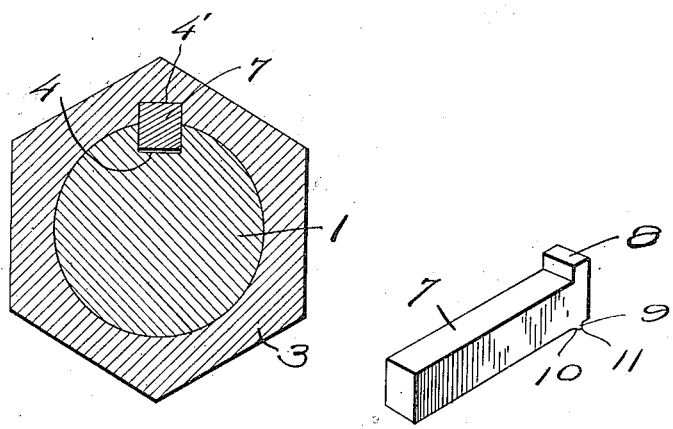
Fig. 2.
Fig. 3.
Inventor
H. Vaterhaus,
By Woodward & Chandlee
Attorneys
Witnesses

UNITED STATES PATENT OFFICE.

HENRY VATERHAUS, OF COOKS, MICHIGAN.

NUT-LOCK.

1,075,523.

Specification of Letters Patent.  Patented Oct. 14, 1913.

Application filed January 24, 1912. Serial No. 673,184.

*To all whom it may concern:*

Be it known that I, HENRY VATERHAUS, a citizen of the United States, residing at Cooks, in the county of Schoolcraft and State of Michigan, have invented certain new and useful Improvements in Nut-Locks, of which the following is a specification.

This invention relates to improvements in nut locks, and has for one of its objects to provide a slotted bolt with a key adapted to be inserted in said slot and lie in a similar slot formed in the bore of the nut.

A further object of the invention is to provide an efficient means for preventing the working loose of the nuts on bolts particularly adapted for use on railroads.

Other objects and advantages will be apparent from the following description and with particular reference to the accompanying drawings.

In the drawings: Figure 1 is a side elevation of a bolt having a nut and key applied thereto in accordance with my invention, and partly broken away, Fig. 2 is a cross section on the line 2—2 of Fig. 1, Fig. 3 is a perspective view of the key.

As seen in the drawings, 1 represents the shank of the bolt, having the screw threads 2 on one end and adapted to have the nut 3 screwed thereon. A groove 4 is formed in the bolt longitudinally thereof and transversely of the threads and having its inner end 5 of slightly less depth than the outer end. The nut 3 has a similar slot 4' in its opening and transversely of the threads and adapted when screwed onto the bolt, to register with the first-mentioned slot or groove 4, and when so registered, to receive the key 7. The key 7 has an upturned head 8 on its outer end adapted to lie against the outer face of the nut when it is driven into the aforesaid registered grooves. The shank of the key is rectangular in cross-section and the slot or groove in the nut, together with the groove in the bolt, form a rectangular passage through which the key is adapted to be inserted. The fact that the inner end of the groove in the bolt is slightly less in depth than the outer end, will have a tendency to force the shank of the key upward against the nut, and in so doing cause the end of said shank to bite into the base of the shallow portion of the groove in the bolt and cant the nut and lock the threads of the bolt and nut together. The head of the key will lie flat against the face of the nut and will not be in the way to be struck by outside objects, so that it would be displaced or broken.

To remove the nut all that it is necessary to do is to insert a suitable chisel like instrument between the head of the key and the nut and by a sharp blow cause the key to be withdrawn when the nut may be readily unscrewed.

To prevent the key backing out, under jarring, I form on the under face of the key, at a suitable distance from the head 8, a transverse tooth 9. This tooth is of a height equal to the difference between the depths of the key and the slots or grooves 4' and 4 of the nut and bolt at their outer ends, so that the tooth may enter the slot 4. The forward face 9 of the tooth is curved and meets the rearward face 10 which is vertical and plain at the outer edge thereof to form a knife edge 11. Thus when the key is forced into the registered slots, the tooth will readily slide forward, but will bite into the bottom wall of the slot 4 upon backward movement.

From the foregoing it will be readily seen that I have provided a simple and effective lock for connecting the nut and the bolt to prevent the nut from working loose.

What is claimed is:

A nut lock comprising a bolt having a longitudinal groove in its threaded end, said groove being of greater depth at its outer end than at its inner end, a nut adapted to be screwed on the bolt and provided with a longitudinally disposed groove of constant depth and width in the wall of the opening in the nut, a key having its shank rectangular in cross section and adapted to be inserted in the grooves of the bolt and nut when registered and having a head adapted to lie against the outer face of the nut, and a transversely arranged tooth on the under face of the key, said tooth having a forward curved face and a rearward plain face, the angle formed by the meeting of the curved and plain faces being adapted to bite into the bottom of the wall of the bolt, the shallowness of the inner end of the slot having a tendency to force the inner end of the shank up against the nut and wedge the parts together.

In testimony whereof I affix my signature, in the presence of two witnesses.

HENRY VATERHAUS.

Witnesses:
J. A. WEHNER,
BEN POFARE.

Copies of this patent may be obtained for five cents each, by addressing the "Commissioner of Patents, Washington, D. C."